April 21, 1931.  I. DOROGI ET AL  1,801,267
INFLATABLE HOLLOW ARTICLES COMPOSED OF FLAT RUBBER SHEETS
Filed Oct. 11, 1928   4 Sheets-Sheet 1
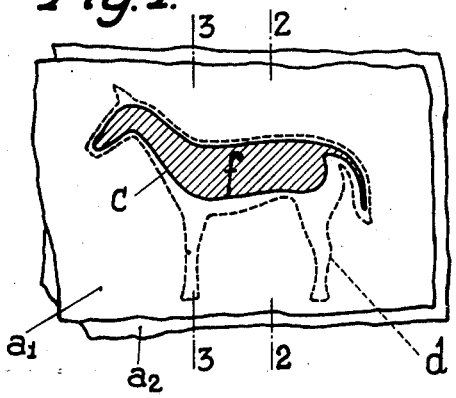
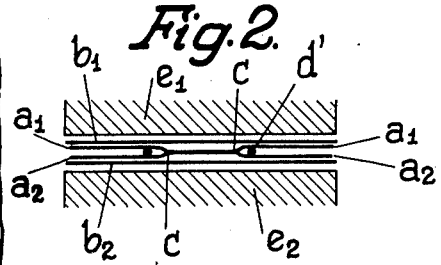
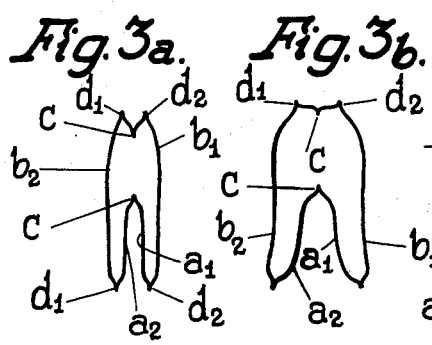
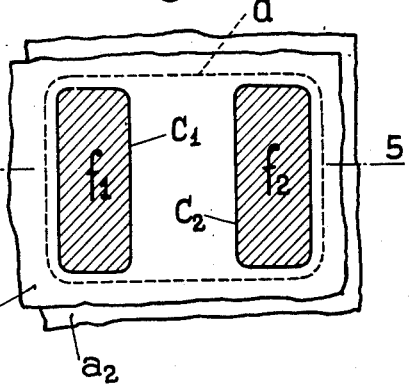
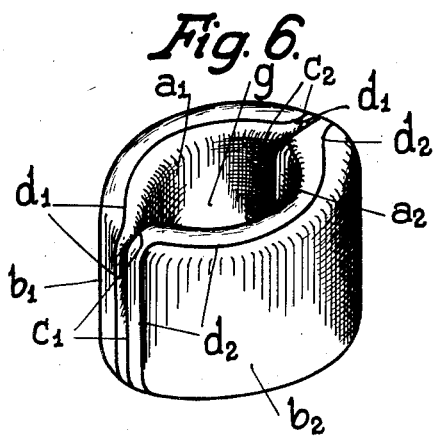
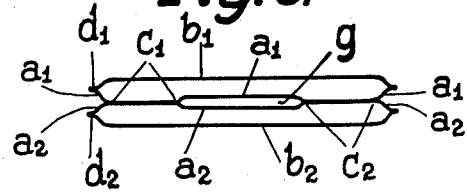

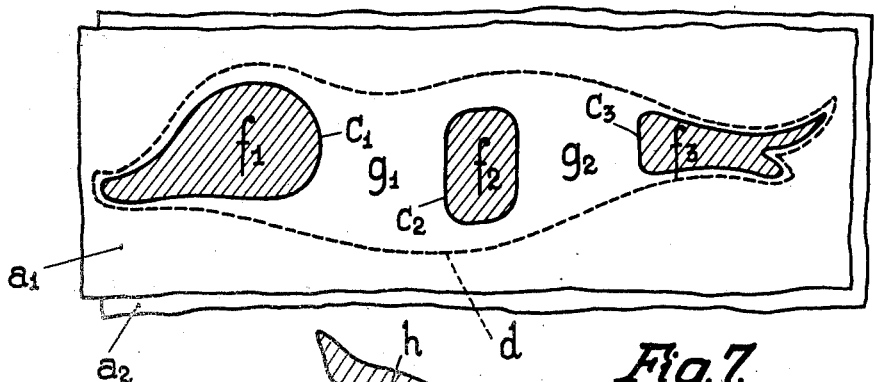
Fig. 7.
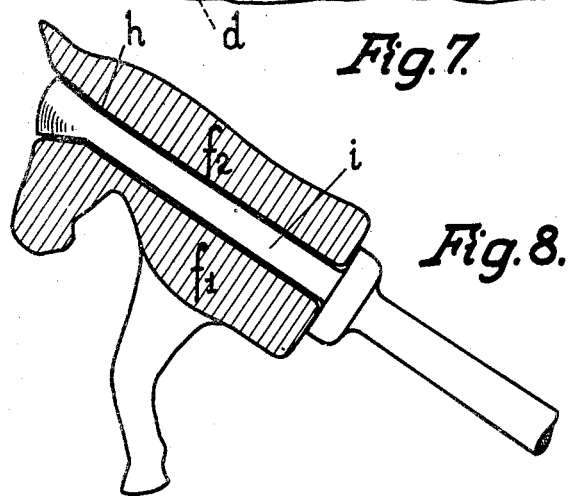
Fig. 8.
Fig. 9.
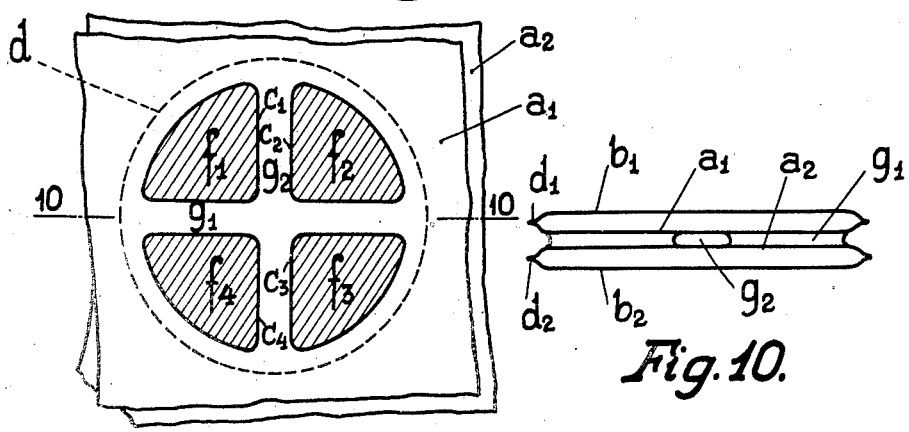
Fig. 10.

April 21, 1931.                I. DOROGI ET AL                1,801,267
            INFLATABLE HOLLOW ARTICLES COMPOSED OF FLAT RUBBER SHEETS
                     Filed Oct. 11, 1928        4 Sheets-Sheet 4

Inventors
Istvan Dorogi
Lajos Dorogi
by Steward + McKay
their attorneys

Patented Apr. 21, 1931

1,801,267

UNITED STATES PATENT OFFICE

ISTVÁN DOROGI AND LAJOS DOROGI, OF BUDAPEST, HUNGARY, ASSIGNORS OF ONE-HALF TO DR. DOROGI ES TÁRSA GUMMIGYAR R. T., OF BUDAPEST-ALBERTFALVA, HUNGARY, A LIMITED COMPANY OF HUNGARY

INFLATABLE HOLLOW ARTICLES COMPOSED OF FLAT RUBBER SHEETS

Application filed October 11, 1928, Serial No. 311,944, and in Hungary February 7, 1928.

This invention relates to improvements in inflatable hollow articles composed of flat rubber sheets.

It is already known to make inflatable rubber hollow articles, reproducing with great likeness to nature, complicated forms, e. g. human or animal forms, from four thin rubber sheets, by introducing between two outer sheets, an insertion piece consisting of a two-ply (two-lobed) flat ring.

Figures 1 and 2 of the drawing illustrate a particularly practical known method of making a hollow article of this kind, representing, in this instance, a quadruped. To begin with, two unvulcanized rubber sheets $a_1$ and $a_2$ are laid over one another and said sheets are cut along the closed curved line $c$ shown as a full line, by means of a blunt stamping die; the hatch-lined portion $f$ goes to waste and the two now ring-shaped sheets $a_1$ and $a_2$ which are now annular or perforated, are then welded together along the line $c$ to form a two-ply, annular device, the cross-section of which is obvious from Figure 2. A stamping die $d'$, consisting of a wire suitably bent to the outline $d$ shown in dotted lines in Figure 1, is now placed between the sheets or layers $a_1$ and $a_2$. After the wire $d'$ has been inserted the device is placed between two additional unvulcanized rubber sheets $b_1$, $b_2$, (as shown in Fig. 2) and rubber sheets are now subjected to pressure between the two pressure plates $e_1$, $e_2$ of a press. The wire stamping die $d'$ cuts through the two sheets $a_1$ and $b_1$ and welds them together along a line of severance corresponding to the outline of member $d$ and said member $d$ also cuts through the two sheets $a_2$ and $b_2$ and welds them together along their line of severance. By this means, a closed hollow body is obtained, the cross-section of which on the line 3—3 Figure 1, is illustrated in a semi-inflated state in Figure 3a and in a highly inflated state in Figure 3b. The seams $d_1$ and $d_2$, which unite the sheets $a_1$ and $b_1$, or $a_2$ and $b_2$ are produced by the stamping die $d'$.

A great variety of the body forms of the inflatable hollow articles may be obtained by using said method, two rubber sheets, and a one-piece insertion member.

Now this invention relates to another form of such a hollow article, wherein it is essential that the rubber insertion piece, instead of being a simple form having a single ring opening, should be a multiple two-ply flat ring, which has two or more openings, the two layers being connected together within their outer or peripheral lines along a plurality of inner and independent peripheral lines.

In the drawing several embodiments of inflatable hollow articles thus formed are illustrated. From these examples the various possibilities and advantages, offered by the new construction, become evident.

Figure 4 shows a top view, analogous to Figure 1, of a two-ply insertion ring with two openings.

Figure 5 shows a longitudinal section along line 5—5, Figure 4, of a finished hollow article in the uninflated state in the production of which an insertion ring according to Figure 4 has been employed.

Figure 6 is the view of the finished hollow article in the inflated state.

Figure 7 shows a life-belt in the form of a fish, the manner of illustration being similar to that used in Fig. 4.

Figure 8 illustrates a hobby-horse figure in section.

Figure 9 shows an insertion ring having four openings for making a ball.

Figure 10 is a cross-section along line 10—10, Figure 9, of the finished ball in the uninflated state.

Figure 11:
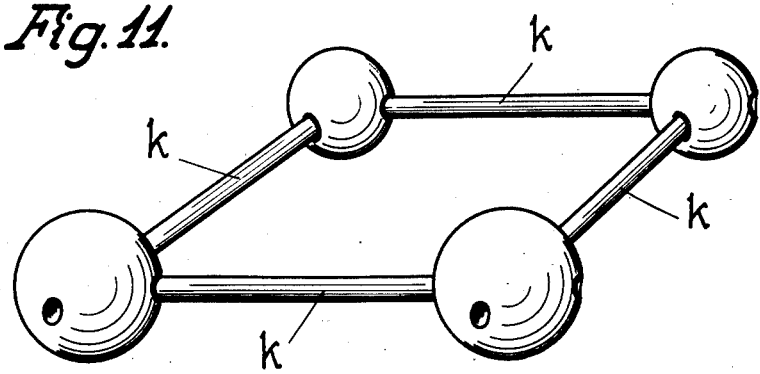
Figure 11 shows a raft formed from the balls as per Figures 9 and 10.

The two openings $f_1$ and $f_2$ are stamped out of the two superposed rubber sheets $a_1$ and $a_2$, the two sheets being then joined together along the inner peripheral lines $c_1$ and $c_2$. This operation produces a two-ply member which may be designated as a rubber insertion piece or member, since it is inserted between two outer sheets of rubber to produce the novel article specified herein. Said two-ply insertion piece or member comprises two sections or lobes which are connected to each other along inner peripheral or contour lines (such as $c_1$ and $c_2$) separated by an intermediate portion in which the plies or layers of said insertion piece are separated from each other. As will be later more fully disclosed, said two-ply insertion piece may have more than two connection lobes or sections. The two-ply rubber insertion member is now inserted and then cut out while it is located between two outer rubber sheets $b_1$ and $b_2$ along the contour line $d$ shown in dotted lines in Figure 4. These operations are performed in the manner described with reference to Figures 1 and 2. These operations produce the ring-shaped hollow article, illustrated in section in Figure 5. The inflated hollow body forms the hollow ring illustrated in Figure 6, the inner face of which, facing the ring-opening $g$, is formed by the two sheets $a_1$ and $a_2$ and the outer contour surface of which is formed by the sheets $b_1$ and $b_2$. The sheets $a_1$ and $b_1$ are connected together by the seam $d_1$ and the sheets $a_2$ and $b_2$ by the seam $d_2$. The ring-half $a_1$, $b_1$ is united at both ends by the seams $c_1$ and $c_2$ with the ring-half $a_2$, $b_2$. In this manner, inflatable life-belts for example, can be made in a very simple manner by two die stamping operations.

The life-belts can, however, instead of being given the simple ring form, be given the shape of any animal, as shown on Figure 7 (which is similar to Fig. 4) in which the life-belt has the form of a fish.

It is also obvious, from this illustration that the insertion piece, instead of having two perforations $f_1$ and $f_2$, can have more perforations. Thus, as shown in Figure 7, three openings $f_1$, $f_2$ and $f_3$, may be provided, in which case two belt-openings $g_1$ and $g_2$ are formed in the finished life-belt, enabling the belt to be used by two persons simultaneously. As the reference letters are the same as in Figures 4–6, a further description of Figure 7 is rendered unnecessary.

Another object of providing several perforations in the two-ply insertion piece may be to produce passage openings or channels in the inflated hollow article.

Figure 8 illustrates, for example, an inflatable rubber hollow article representing the forward part of a horse's body provided with a head. By dividing the inner opening of the double ply insertion ring into the two openings $f_1$ and $f_2$ a longitudinal channel is formed in the inflated body through which a stick $i$ can be put to enable the hollow article to be use as a hobby-horse.

Figure 9 illustrates, by way of example, an insertion member having four openings $f_1$, $f_2$, $f_3$, $f_4$, this view being similar to Figure 4.

The two-ply insertion ring $a_1$, $a_2$ has four cut-out parts $f_1$, $f_4$ and is thus a quadruple two-ply ring. Thus, as is obvious from Figure 10, which shows a cross-section along the line 10—10, of Figure 9, (this shows the finished ball in the uninflated state), two intersecting longitudinal channels $g_1$ and $g_2$, are formed through which sticks can also be inserted. From such inflated balls, rafts can be constructed by means of a suitable number of sticks $k$ as shown in Figure 11. These rafts can maintain a number of persons floating on the surface of the water.

Figure 12:
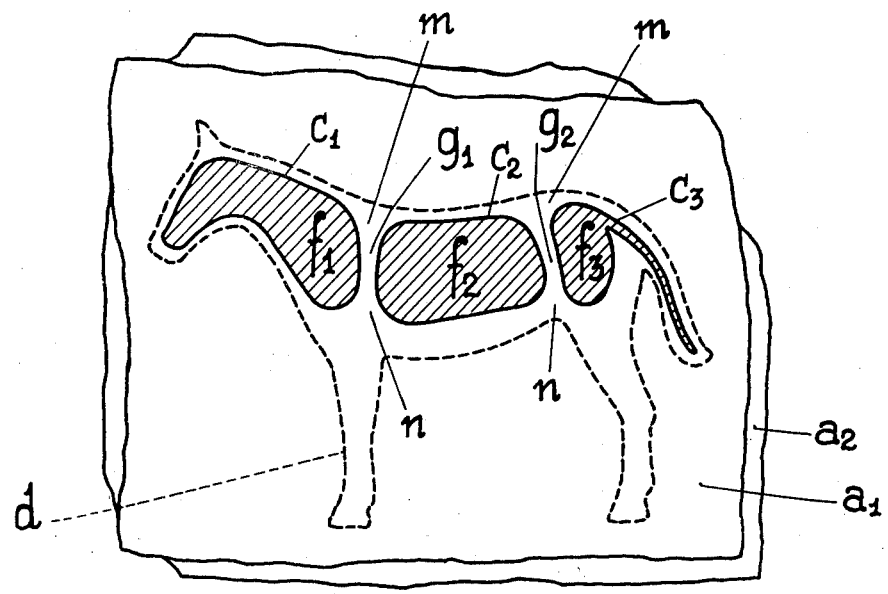
Figure 12 shows the insertion ring used to form a quadruped shape and having three openings, the method of illustration being similar to that used in Figure 1.

Figure 12 illustrates a quadruped form in a state similar to Figure 1, but in which the two-ply insertion member has three openings $f_1$, $f_2$, and $f_3$, so that channels $g_1$ and $g_2$ are formed in the inflated animal body, between the front legs and between the hind legs. It is not, however, the channels that are essential but rather the parts $m$ of the back are connected to the parts $n$ of the breast or groin by the annular-seams $c_1$, $c_2$, $c_3$, connecting the two plies of the insertion ring between the two legs of each pair of legs. On inflation, a tensile stress is therefore set up at the spots $n$, $n$, the legs being drawn together against the spreading tendency caused by the inflation pressure, so that said legs can be kept in a completely parallel position.

Relatively complicated figures can, however, also be reduced to a ring shape, for example, a pair of human figures clasping one another with both arms or, for example, a wrestling or dancing couple, or a human figure holding an object, say, a ball with both hands.

Figure 14:
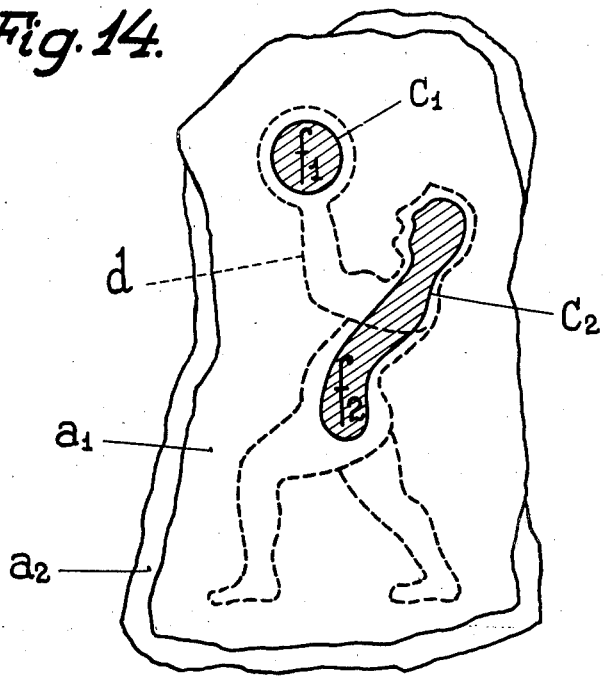
Figures 13 and 14 show the insertion ring for a dancing pair and respectively for a figure, holding up a ball with both arms.
Figure 13:
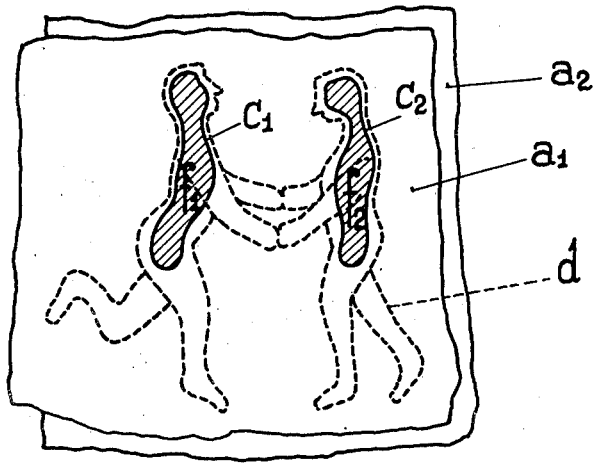

Figure 13 illustrates, by way of example, the two-ply insertion member for a dancing couple and Figure 14 for a figure holding up a ball with both arms, the method of illustration being analogous to that used in Figures 4, 7, 9 and 12.

In both figures, the outer contour lines of the two plies and in addition, also the outer contour lines of the two outer side sheets are different from one another, owing to which fact it becomes possible to give to the right and left arms or respectively legs positions different from one another.

Having now particularly described and ascertained the nature of our said invention and in what manner the same is to be performed, we declare that what we claim is:

1. A rubber article comprising a pair of outer sheets and a pair of intermediate sheets located between said outer sheets, each of said outer sheets being joined along its margin to the margin of the adjacent intermediate sheet, said intermediate sheets having a plurality of spaced pairs of aligned openings spaced from the central portion of the device, the edges of each pair of aligned openings being joined to each other, said intermediate sheets being separated from each other at the central portion of the device.

2. An inflatable hollow rubber article made of a pair of outer sheets of rubber and a pair of inner sheets of rubber located between said outer sheets, said sheets being superposed and forming a flat article when said hollow rubber article is deflated, the margin of each inner sheet being connected with the margin of the adjacent outer sheet, said inner sheets being connected to each other intermediate their margins along a plurality of closed lines which are spaced from each other, so that the portions of said inner sheets which are intermediate said closed lines form an inner annular wall of said article when said article is inflated.

In testimony whereof we affix our signatures.

ISTVÁN DOROGI.
LAJOS DOROGI.